United States Patent [19]

Shaffer et al.

[11] 4,037,110
[45] July 19, 1977

[54] YTTRIUM INDIUM PHOSPHATE X-RAY PHOSPHORS, METHOD OF PREPARATION AND X-RAY INTENSIFYING SCREEN CONTAINING SAME

[75] Inventors: Francis N. Shaffer, Towanda; James E. Mathers, Ulster, both of Pa.

[73] Assignee: GTE Sylvania Incorporated, Stamford, Conn.

[21] Appl. No.: 652,500

[22] Filed: Jan. 26, 1976

[51] Int. Cl.$^2$ .............................................. C09K 11/46
[52] U.S. Cl. ............................. 250/483; 252/301.4 P; 428/539
[58] Field of Search ................ 252/301.4 P; 250/483, 250/460; 428/539

[56] References Cited

U.S. PATENT DOCUMENTS

| | | | |
|---|---|---|---|
| 2,898,302 | 8/1959 | Butler | 252/301.4 P |
| 3,481,884 | 12/1969 | Palilla et al. | 252/301.4 P |
| 3,609,094 | 9/1971 | Shaffer | 252/301.4 P |
| 3,634,282 | 1/1972 | Denis et al. | 252/301.4 P |
| 3,925,674 | 12/1975 | D'Silva et al. | 252/301.4 P X |

OTHER PUBLICATIONS

Nakano et al., "Chem Abstract", vol. 82, 1975, 132040r.
D'Silva et al. II, "Chem Abstract", vol. 78, 1973.

*Primary Examiner*—Jack Cooper
*Attorney, Agent, or Firm*—Norman J. O'Malley; Donald R. Castle; John C. Fox

[57] ABSTRACT

An X-ray phosphor composition consisting essentially of a material having the formula $$(Y_{1-x}In_xPO_4)$$

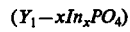

wherein X has a value of from about 0.005 to about 0.2, emits in the area of the spectrum of from about 300 to about 460 nanometers when excited by X-rays. A method of preparing the phosphor composition and an X-ray intensifying screen containing the same are described.

8 Claims, 2 Drawing Figures

YTTRIUM INDIUM PHOSPHATE X-RAY PHOSPHORS, METHOD OF PREPARATION AND X-RAY INTENSIFYING SCREEN CONTAINING SAME

BACKGROUND OF THE INVENTION

1. Field of the Invention

This invention relates to X-ray phosphors. More particularly it relates to indium-activated yttrium phosphate.

2. Prior Art

Calcium tungstate has been widely used for many years as the phosphor for X-ray intensifying screens. The emission of calcium tungstate peaks at about 435 nanometers. The X-ray film commonly in use is a blue sensitive film with the film having a sensitivity in the 300 to 470 nanometer range. The sensitivity of the film is drastically reduced above about 470 nanometers.

Recently, Buchanan et al in RADIOLOGY 105: 185–190, October, 1972, indicated that the terbium-activated rare earth oxysulfides have a better efficiency of absorption of X-rays than calcium tungstate. They also state that a green-sensitive film is necessary to utilize the full benefits from the more efficient phosphors. Because the above oxysulfide phosphors have a higher efficiency and while the emission thereof does peak outside the sensitivity range for these phosphors, there is a sufficient overlap into the blue film sensitivity range to enable a one-half reduction in exposure to X-rays when these materials are compared to calcium tungstate.

Even more recently D'Silva et al in the JOURNAL OF LUMINESCENCE 8:375–328 (1974) disclosed that terbium-activated yttrium-gadolinium phosphates were promising candidates for X-ray intensifying screens. When tested against calcium tungstate, europium-activated barium phosphate and terbium-activated gadolinium oxysulfide on blue sensitive film, the terbium-activated yttrium-gadolinium phosphate was found to be marginally superior to the above oxysulfide.

Both of these newer phosphors contain terbium. While in some instances this may be an advantage, e.g., fewer raw materials to handle and keep isolated, etc., terbium is a relatively scarce material and is quite costly.

It is believed, therefore, a blue-emitting X-ray phosphor which does not utilize terbium but which is equivalent to the newer terbium activated phosphors would be an advancement in the art. It is also believed that an X-ray intensifying screen suitable for use in conjunction with standard blue sensitive film would be an advancement in the art. It is further believed that a process for producing such phosphors is an advancement in the art.

OBJECTS AND SUMMARY OF THE INVENTION

It is an object of this invention to provide an X-ray phosphor having an emission primarily in the range of about 300 to 460 nanometers.

It is a further object of this invention to provide a blue emitting X-ray phosphor having a brightness greater than calcium tungstate.

It is still another object of this invention to provide an X-ray phosphor that avoids the use of the relatively scarce terbium element.

It is an additional object of this invention to provide an improved X-ray intensifying screen for use in conjunction with blue sensitive X-ray film.

It is still a further object to provide a process for producing indium activated yttrium phosphate X-ray phosphors.

These and other objects are achieved in one aspect of this invention wherein there is provided an X-ray phosphor consisting essentially of a material of the formula $Y_{1-x}In_xPO_4$, wherein X has a value of from about 0.005 to about 0.2. The material, when excited by X-rays, has virtually all of its emission in the range of about 300 to 460 nanometers. In an additional embodiment of this invention a reactive source of a rare earth selected from a yttrium source, a reactive source of indium, a decomposable phosphate source are blended together to form a relatively uniform first admixture in the desired ratios, heating the first admixture from about 550° to about 900° C for about 2 to 4 hours, comminuting the resulting mass, blending a flux with the comminuted mass to form a second admixture, heating the second admixture from about 1000° C to about 1350° C for about 2 to about 16 hours. In still another embodiment, an X-ray intensifying screen, which utilizes the foregoing blue-emitting rare earth-indium phosphate X-ray phosphor, provides a compatible intensifying screen for use with the blue sensitive X-ray film that is currently being used with calcium tungstate.

DESCRIPTION OF THE PREFERRED EMBODIMENTS

Figure 1:
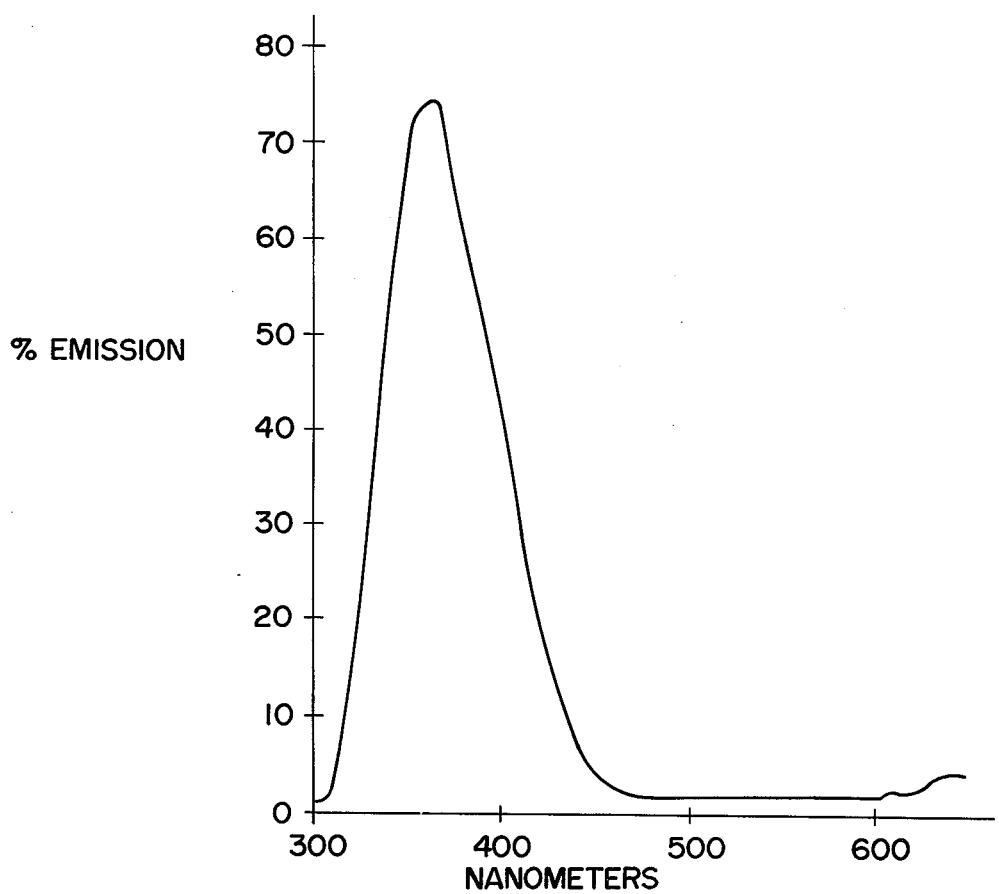
FIG. 1 is a typical emission spectra of one specie of the phosphors of this invention when excited X-rays.

For a better understanding of the present invention, together with other and further objects, advantages and capabilities thereof, reference is made to the following disclosure and appended claims in connection with the above-described drawings.

According to the HANDBOOK OF CHEMISTRY AND PHYSICS, 54 Ed., Chem. Rubber Pub. Co., Cleveland, Ohio (1973), the price of terbium is about $750 per pound while the price of indium is from about $24 to about $80 per pound. It is believed to be apparent that the phosphor of this invention offers a lower cost X-ray phosphor that the terbium-activated rare earth oxysulfides, for example, terbium-activated gadolinium oxysulfide. The world supply of terbium is much more limited than is the supply of indium, thus there should not be a shortage of indium in the foreseeable future.

The X-ray phosphors of this invention can be represented by the formula

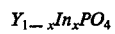

wherein X is from about 0.005 to about 0.02. An alternative description of the compositions of this invention is an X-ray phosphor composition consisting essentially of a host of yttrium phosphate and from about 0.5 molar percent to about 20 molar percent of indium as indium phosphate as an activator.

In the process of this invention the above composition is prepared by first forming a relatively uniform admixture of a reactive source of yttrium, a reactive source of indium and a phosphate ion source. While yttrium oxide is the preferred reactive rare yttrium sources, any yttrium source which will react with a phosphate ion in a solid state reaction to form the corresponding yttrium phosphate can be used. Suitable reactive sources include but are not limited to yttrium oxides, oxalates, acetates, carbonates and comparable yttrium salts which will react with a phosphate ion source such as orthophosphoric acid, monammonium phosphate, diammonium phosphate and the like. A means for establishing if a yttrium source is a reactive material thus suitable (assuming it has the requisite high purity of greater than 99.7%, which is required of all phosphor raw materials) is to slurry or dissolve a small amount (such as 0.1 grams in 100 ml of water) of the raw material in water and add the resulting solution to an aqueous solution of relatively concentrated phosphoric acid. If a precipitate of the yttrium phosphate is formed such a rare earth source is thus reactive and suitable for use as a raw material in the practice of this invention.

The sources of indium which are encompassed by this invention are those reactive indium sources which will form indium in its +3 valence state under the reaction conditions thereby enabling it to be included in the matrix as an activator for the rare earth phosphate host. Suitable materials include but are not limited to $IN_2O_3$, InP, $In(No_3)_3$ and the like. If an indium salt is used the anion must either form a volatile or a water soluable reaction product thereby enabling it to be removed from the phosphor. Indium oxide, $In_2O_3$ is the preferred reactive source of indium.

Various water soluble phosphate sources can be used, for example, phosphoric acid, monoammonium phosphate, diammonium phosphate triammonium phosphates and the like. If phosphate salts are used the cation of the salt must form a reaction product which is either water soluble or volatile. Since the ammonium phosphates and phosphoric acid are used in the production of other luminescent materials these are the preferred phosphate sources.

The formulated molar ratios of the rare earth and indium can be varied to yield a theoretical atomic ratio of rare earth to indium of from about 99.5:0.5 to about 8:2, with the preferred ratio being from about 98:2 to about 93:7. An excess of phosphate source may be used, that is although the number of rare earth ions plus the indium ions is equal to the phosphate ions in the above formula, which characterizes the compositions of this invention, an excess of the phosphate source may be used to insure essentially complete conversion of the rare earths and indium to the phosphate salts. If residual phosphates are in the composition after firing they are removed during the subsequent water washing step. Generally about 5 to 15 molar percent excess phosphate source is used. Below about 5% can result in unreacted rare earth values and no benefits are achieved by excesses not greater than 15%.

The first step in the process of this invention is to form a relatively uniform admixture of the reactive yttrium source, the reactive indium source and the water soluble phosphate source. Conventional methods of forming the admixture can be used, e.g., blending, mixing, milling, etc.

After the uniform admixture is prepared it is heated to a temperature of from about 500° to about 900° C. The temperature is raised from above about 500° C rather gradually, that is, at a rate of increase of about 400° C/hr. After holding the temperature at about 900° C for about 2 hours, the heated material is cooled to about room temperature and comminuted to a homogeneous mixture of particles having a size of less than 20 mesh (U.S.S.S.). If desired, a flux can be added to aid in the particle size control. Fluxes have long been used in the manufacture of luminescent materials and are familiar to one skilled in the art. Fluxes which are either water soluble or volatile are used. If a flux is added the materials are blended to achieve a uniform distribution of flux and then heated to a temperature of about 1100° C to about 1350° C for about 2 to 16 hours.

After firing the impure phosphor undergoes a post firing treatment step which purifies it and transforms it from a cake to a usable powder form. The fired phosphor cake is treated with water and dilute nitric acid to remove any unreacted raw material. Most rare earth sources if not soluble in water are soluble in nitric acid. Separate steps can be used or dilute nitric acid can be used. Although alternative treatment steps and procedures can be used, it is preferred to add the fired phosphor cake to a warm dilute solution of nitric acid and to agitate the resulting slurry until the cake transforms into a finely divided crystalline powder. The powder material is then washed with water and dried about 120° C. Annealing the dried phosphor at about 500° C to about 600° C in air for about 1 to about 3 hours improves the brightness of the resulting phosphor but is not essential.

While no particular atmosphere is used during the heating steps prior to washing, strong oxidizing or strong reducing atmospheres are avoided. A mild reducing, a neutral atmosphere or a mild oxidizing atmosphere can be used. Closed containers inside a furnace such as an electric furnace is suitable.

Other procedures can be used to prepare the compositions of this invention, such as an adoption of the procedure disclosed by Ropp in the JOURNAL OF THE ELECTROPLATING SOCIETY, Vo. 115, No. 5, May 1968 for preparing rare earth phosphates activated by a different activator. Other procedures for forming other luminescent metal phosphates can be adapted by one skilled in the art to produce the indium activated rare earth phosphates of this invention. Such procedures are disclosed in U.S. Pat. Nos. 3,539,857, 3,025,423 and 3,609,094 and U.S. Pat application B 327,899 which issued as a defensive publication.

To more fully illustrate the subject invention, the following detailed examples are presented. All parts, percentages and proportions are by weight unless otherwise indicated.

EXAMPLE 1

About 26.80 parts of yttrium oxide, $Y_2O_3$, about 1.75 parts of indium oxide, $In_2O_3$, and about 31.00 parts of ammonium dihydrogen phosphate, $NH_4H_2PO_4$, are dry blended at about room temperature by a mixer mill. The blended material is placed into an uncovered platinum crucible which in turn is placed for support inside a crucible covered with a lid. The crucible unit with material is placed into an electric furnace at about 500° C and gradually heated to about 780° C over a period of about 2.75 hours and then removed from the furnace to cool. The material is then mortared and replaced into the crucible unit and furnace and fired at a temperature of about 900° C for about 2 hours and then removed from the furnace to cool. The material is then mortared to a powder consistency and placed in the mixer mill originally used for its initial prefire blending an 5.0 parts of sodium pyrophosphate, $Na_4P_2O_7 \cdot 10H_2O$, is added as a flux. The material with the flux is blended briefly by the mixer mill and refired again for about 1.5 hours at about 1000° C gradually increased to about 1350° C plus about 2 hours additional time at 1350° C and then is removed from the furnace to cool. When cool, the material, a white bodycolored, very hard fused mass, is reduced to a finely divided crystalline powder by the following treatment.

Agitation is set up with an electric motor driven stainless steel stirred in a heated solution of 300 parts deionized water plus 130 parts of concentrated nitric acid. The fused cake of fired material is added to the solution. Agitation is maintained for about 1 hour with the solution at about 90° C after which time the agitation is shut off briefly and the cake crushed. Agitation, while heating is then resumed for about one-half hour and the material is transformed to a powder suspension.

The suspension at this point is allowed to stand a few minutes until the suspended powder settles and then the clear supernatant solution is decanted off. Three hot deionized water washes are used by adding water stirring for about 5 to about 10 minutes, settling, then the clear supernatant liquid is decanted off.

The slurry after the third water washed is filtered and the filter cake is then oven dried at about 120° C to a bone-dry state and then sifted through a 60-mesh sieve. Data given in Table 1 for Sampler Number 2 and in FIG. 1 is typical for material prepared according to this procedure. FIG. 1 is the emission spectra of the $Y_{0.95}In_{0.05}PO_4$ prepared by this Example.

EXAMPLE 2

The following ingredients are blended together:
$Y_2O_3$ — 107.27 parts
$In_2O_3$ — 6.94 parts
$NH_4H_2PO_4$ — 123.66 parts The material is fired for about 1 hour at 500° up to 900° C and then an additional 2 hours at about 900° C before removal from furnace to cool. The material is then broken up with mortar and pestle and 20 parts of $Na_4P_2O_7 \cdot 10H_2O$ is blended in as a flux and the fluxed material is then refired at about 1100° C for about 16 hours.

When given the general post-fire treatment described for Example 1, the above material is a crystalline powder that strongly emits blue under 80 Kvp X-ray excitation. A portion of the material which is annealed for about 2 hours at about 550° C in air is found to have increased powder cell X-ray speed due to annealing.

Figure 2:
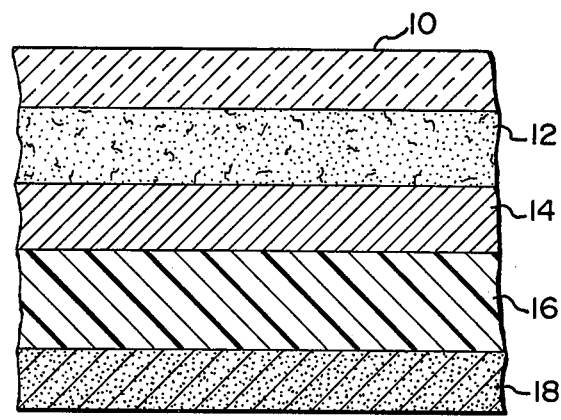
FIG. 2 is a cross-sectional view of an intensifying screen of this invention.

With particular reference to FIG. 2, there is shown an cross-section of an intensifying screen of this invention. In more detail, the screen is a five-layer composite. The upper layer 10 is a thin protective coating which is transparent to visible light and can be a clear plastic. The phosphors of this invention, namely indium-activated yttrium phosphate form a layer 12 below the protective coating 10. A first optional light reflecting layer 14 such as a dispersion of titanium dioxide in a suitable binder constitutes a covering over base 16 which is transparent to X-rays such as paper, cellulose acetate, polystryene, polymetracylate can be used. A means, not shown, for retaining the phosphor layer on the base 16 or the optional light reflecting layer 14 is used and is normally a binder which is transparent to both X-rays and visible light. A second optional layer 18 on the opposing side of the base 16 is to visibly reflect light and can be aluminum or a resin containing aluminum particles if the base is not opaque to visible light. As previously mentioned, the visible light reflecting layers 14 and 18 as well as the protective layer 10 are not essential to the proper functioning of this invention.

While there has been shown and described what are at present considered the preferred embodiments of the invention, it will be obvious to those skilled in the art that various changes and modifications may be made therein without departing from the scope of the invention as defined by the appended claims.

What is claimed is:

1. An X-ray phosphor composition consisting essentially of a material having the formula:

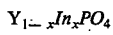
$Y_{1-x}In_xPO_4$ wherein X has a value of from about 0.005 to about 0.2.

2. A composition according to claim 1 wherein the value for X is from about 0.03 to about 0.07.

3. An X-ray intensifying screen comprising a base which is transparent to X-rays, an X-ray phosphor composition consisting essentially of a material having the formula:

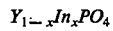
$Y_{1-x}In_xPO_4$ wherein X has a value of from about 0.005 to about 0.2 and a means for retaining the phosphor composition within said screen.

4. An X-ray intensifying screen according to claim 3 wherein the value for X is from about 0.03 to about 0.07.

5. A process for producing an X-ray phosphor composition consisting essentially of a material having the formula $Y_{1-x}In_xPO_4$ wherein x has a value of from about 0.005 to about 0.2 comprising:

a. forming a relatively uniform first admixture of a reactive source of yttrium, a reactive indium source and a decomposable phosphate source of phosphate ions, said phosphate source being present in an amount sufficient to yield a molar ratio of phosphate ions to the total of yttrium and indium present greater than 1:1, b. heating said first admixture to a temperature of from about 500° C to about 900° C for about 2 to 4 hours to form a first mass, c. cooling said first mass to about room temperture, d. comminuting said mass to achieve particles of a size less than the opening in about a 20 mesh USSSieve screen and forming a second admixture of particles, e. heating said second admixture to a temperature of from about 1000° C to about 1350° C for about 2 to about 16 hours to form a second mass, f. washing said second mass with water and dilute nitric acid to form a powder, and g. drying said powder, 6. A process according to claim 5 wherein a water soluble or volatile flux is incorporated in said second admixture.

7. A process according to claim 6 wherein said flux is sodium pyrophosphate.

8. A process according to claim 5 wherein the said yttrium to indium molar ratio is from about 99.5:0.5 to about 8:2.

* * * * *

UNITED STATES PATENT AND TRADEMARK OFFICE
CERTIFICATE OF CORRECTION

PATENT NO. : 4,037,110
DATED : July 19, 1977
INVENTOR(S) : Francis N. Shaffer and James E. Mathers It is certified that error appears in the above-identified patent and that said Letters Patent are hereby corrected as shown below:

Col. 1, line 35 - Please delete "8:375-328" and insert
 -- 8:375-382 --.

Col. 2, line 18 - Please delete "550°" and insert -- 500° --.

Col. 2, line 59 - Please delete "0.02" and insert -- .2 --.

Col. 4, line 66 - Please delete "an" and insert -- and --.

Col. 5, line 9 - Please delete "stirred" and insert --
 stirrer --.

Signed and Sealed this

Eleventh Day of October 1977

[SEAL]

Attest:

RUTH C. MASON
Attesting Officer

LUTRELLE F. PARKER
Acting Commissioner of Patents and Trademarks